US012772159B2

(12) United States Patent
Li et al.

(10) Patent No.: US 12,772,159 B2
(45) Date of Patent: Oct. 20, 2026

(54) NETWORK SELECTION METHOD AND APPARATUS, TERMINAL, AND NETWORK-SIDE DEVICE

(71) Applicant: VIVO MOBILE COMMUNICATION CO., LTD., Chang'an (CN)

(72) Inventors: Huan Li, Chang'an (CN); Xiaowan Ke, Chang'an (CN); Zhenhua Xie, Chang'an (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 274 days.

(21) Appl. No.: 18/606,647

(22) Filed: Mar. 15, 2024

(65) Prior Publication Data

US 2024/0224170 A1 Jul. 4, 2024

Related U.S. Application Data

(63) Continuation of application No. PCT/CN2022/118340, filed on Sep. 13, 2022.

(30) Foreign Application Priority Data

Sep. 16, 2021 (CN) ......................... 202111089220.2

(51) Int. Cl.
*H04W 48/18* (2009.01)
*H04W 84/04* (2009.01)

(52) U.S. Cl.
CPC .......... *H04W 48/18* (2013.01); *H04W 84/042* (2013.01)

(58) Field of Classification Search
CPC ... H04W 48/18; H04W 84/042; H04W 48/04; H04W 48/16

(Continued)

(56) References Cited

U.S. PATENT DOCUMENTS 9,775,099 B2 * 9/2017 Laselva ................. H04W 48/18
2021/0037380 A1 * 2/2021 Lee ....................... H04W 12/08

(Continued)

FOREIGN PATENT DOCUMENTS

CN 104812024 A 7/2015
CN 110213808 A 9/2019

(Continued)

OTHER PUBLICATIONS

Qualcomm Incorprorated et al: "SNPN selection for access to SNPNs using credentials from an entity separate from the SNPN", 3GPP DRAFT; C1-212036. ZIP S2-2101079, 3rd Generation Partnership Project (3GPP), Mobile Competence Centre; 650, Route Des Lucioles ; F-06921 Sophia-Antipolis Cedex ; France, vol. SA WG2, No. e (e-meeting); Feb. 24, 2021-Mar. 9, 2021, Apr. 8, 2021 (Apr. 8, 2021), XP051994516.

(Continued)

*Primary Examiner* — Hirdepal Singh

(57) ABSTRACT

This application discloses a network selection method and apparatus, a terminal, and a network-side device. The network selection method in embodiments of this application includes: obtaining, by a terminal, network selection policy information, where the network selection policy information includes a network identifier of at least one network and a network selection condition corresponding to the at least one network, and the at least one network includes at least one non-public network; and determining, based on the network selection condition corresponding to the at least one network, a target network to be accessed, where the network selection condition includes at least one of the following: time information, location information, and service parameter information.

19 Claims, 6 Drawing Sheets

(58) Field of Classification Search
USPC .......................................................... 455/434
See application file for complete search history.

(56) References Cited

U.S. PATENT DOCUMENTS

| | | | | |
|---|---|---|---|---|
| 2021/0385739 | A1* | 12/2021 | Wang .................... | H04W 48/18 |
| 2022/0060883 | A1* | 2/2022 | Zhu ....................... | H04W 8/245 |
| 2022/0225093 | A1* | 7/2022 | Sasi ...................... | H04W 12/06 |
| 2024/0236837 | A1* | 7/2024 | Hong .................... | H04W 36/14 |

FOREIGN PATENT DOCUMENTS

| | | | |
|---|---|---|---|
| CN | 110710275 | B | 12/2020 |
| WO | 2020224622 | A1 | 11/2020 |
| WO | 2020250664 | A1 | 12/2020 |

OTHER PUBLICATIONS

First Office Action dated Apr. 23, 2025 received in corresponding patent family application No. CN202111089220.2. English translation attached.
Extended European Search Report dated Dec. 5, 2024 received in corresponding European Application No. EP22869175.4.
International Search Report dated Dec. 7, 2022 in International Application No. PCT/CN2022/118340. English translation attached.
Written Opinion of the ISA dated Dec. 7, 2022 in International Application No. PCT/CN2022/118340. English translation attached.

* cited by examiner

NETWORK SELECTION METHOD AND APPARATUS, TERMINAL, AND NETWORK-SIDE DEVICE

CROSS-REFERENCE TO RELATED APPLICATIONS

This application is a Bypass Continuation Application of PCT International Application No. PCT/CN2022/118340 filed on Sep. 13, 2022, which claims priority to Chinese Patent Application No. 202111089220.2, filed on Sep. 16, 2021 and entitled "NETWORK SELECTION METHOD AND APPARATUS, TERMINAL, AND NETWORK-SIDE DEVICE", which is incorporated herein by reference in its entirety.

TECHNICAL FIELD

This application pertains to the field of communications technologies, and specifically, relates to a network selection method and apparatus, a terminal, and a network-side device.

BACKGROUND

Currently, terminals generally transmit data services through a public network (for example, a public land mobile network (PLMN)). In response to requirements of vertical industries in the future, the 3GPP puts forward a concept of a non-public network (NPN). The NPN may be configured to serve terminals in the vertical industries. The NPN is classified into the following types: a standalone non-public network (SNPN) and a public network integrated non-public network (Public Network Integrated NPN, PNI-NPN).

For the foregoing different networks, an urgent problem to be resolved by a person skilled in the art is how a terminal selects a suitable network for access, so that communication of the terminal is not affected.

SUMMARY

Embodiments of this application provide a network selection method and apparatus, a terminal, and a network-side device.

According to a first aspect, a network selection method is provided and applied to a terminal. The method includes:

- obtaining, by the terminal, network selection policy information, where the network selection policy information includes a network identifier of at least one network and a network selection condition corresponding to the at least one network, and the at least one network includes at least one non-public network; and
- determining, by the terminal based on the network selection condition corresponding to the at least one network, a target network to be accessed, where the network selection condition includes at least one of the following: time information, location information, and service parameter information.

According to a second aspect, a network selection method is provided and applied to a network-side device. The method includes:

- sending, by the network-side device, network selection policy information to a terminal, where the network selection policy information includes a network identifier of at least one network and a network selection condition corresponding to the at least one network, the at least one network includes at least one non-public network, the network selection condition corresponding to the at least one network is used by the terminal to determine a target network to be accessed, and the network selection condition includes at least one of the following: time information, location information, and service parameter information.

According to a third aspect, a network selection apparatus is provided and includes:

- an obtaining module, configured to obtain network selection policy information, where the network selection policy information includes a network identifier of at least one network and a network selection condition corresponding to the at least one network, and the at least one network includes at least one non-public network; and
- a processing module, configured to determine, based on the network selection condition corresponding to the at least one network, a target network to be accessed, where the network selection condition includes at least one of the following: time information, location information, and service parameter information.

According to a fourth aspect, a network selection apparatus is provided and includes:

- a sending module, configured to send network selection policy information to a terminal, where the network selection policy information includes a network identifier of at least one network and a network selection condition corresponding to the at least one network, the at least one network includes at least one non-public network, the network selection condition corresponding to the at least one network is used by the terminal to determine a target network to be accessed, and the network selection condition includes at least one of the following: time information, location information, and service parameter information.

According to a fifth aspect, a terminal is provided. The terminal includes a processor, a memory, and a program or instructions stored in the memory and capable of running on the processor. When the program or instructions are executed by the processor, the steps of the method according to the first aspect are implemented.

According to a sixth aspect, a terminal is provided and includes a processor and a communication interface. The communication interface is configured to obtain network selection policy information, where the network selection policy information includes a network identifier of at least one network and a network selection condition corresponding to the at least one network, and the at least one network includes at least one non-public network. The processor is configured to determine, based on the network selection condition corresponding to the at least one network, a target network to be accessed, where the network selection condition includes at least one of the following: time information, location information, and service parameter information.

According to a seventh aspect, a network-side device is provided. The network-side device includes a processor, a memory, and a program or instructions stored in the memory and capable of running on the processor. When the program or instructions are executed by the processor, the steps of the method according to the first aspect are implemented.

According to an eighth aspect, a network-side device is provided and includes a processor and a communication interface. The communication interface is configured to send network selection policy information to a terminal, where the network selection policy information includes a network identifier of at least one network and a network selection condition corresponding to the at least one network, the at least one network includes at least one non-public network, the network selection condition corresponding to the at least one network is used by the terminal to determine a target network to be accessed, and the network selection condition includes at least one of the following: time information, location information, and service parameter information.

According to a ninth aspect, a readable storage medium is provided. The readable storage medium stores a program or instructions. When the program or instructions are executed by a processor, the steps of the method according to the first aspect are implemented, or the steps of the method according to the second aspect are implemented.

According to a tenth aspect, a chip is provided. The chip includes a processor and a communication interface. The communication interface is coupled to the processor. The processor is configured to run a program or instructions to implement the method according to the first aspect or implement the method according to the second aspect.

According to an eleventh aspect, a computer program or program product is provided. The computer program or program product is stored in a storage medium. The program or program product is executed by at least one processor to implement the steps of the network selection method according to the first aspect or the second aspect.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specified order or sequence. It should be understood that the terms used in this way are interchangeable in appropriate circumstances, so that the embodiments of this application can be implemented in other orders than the order illustrated or described herein. In addition, objects distinguished by "first" and "second" usually fall within one class, and a quantity of objects is not limited. For example, there may be one or more first objects. In addition, the term "and/or" in the specification and claims indicates at least one of connected objects, and the character "/" generally represents an "or" relationship between associated objects.

It should be noted that technologies described in the embodiments of this application are not limited to a long term evolution (LTE)/LTE-Advanced (LTE-A) system, and can also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. The described technologies may be used for the foregoing systems and radio technologies, and may also be used for other systems and radio technologies. However, in the following descriptions, the new radio (NR) system is described for an illustrative purpose, and NR terms are used in most of the following descriptions. These technologies may also be applied to other applications than an NR system application, for example, a 6th Generation (6G) communications system.

Figure 1:
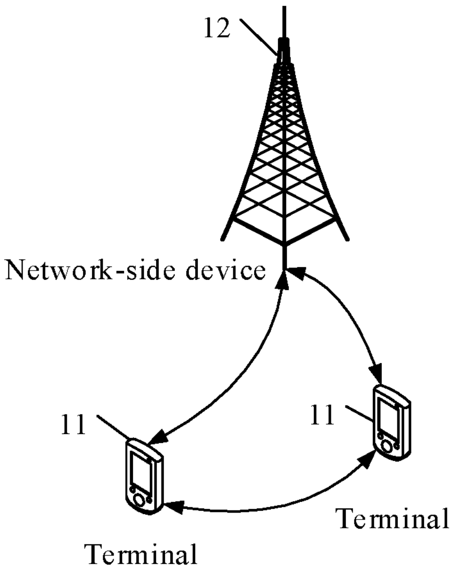
FIG. 1 is a structural diagram of a wireless communications system to which an embodiment of this application can be applied.

FIG. 1 is a structural diagram of a wireless communications system to which an embodiment of this application may be applied. The wireless communications system includes a terminal 11 and a network-side device 12. The terminal 11 may also be referred to as a terminal device or user equipment (UE). The terminal 11 may be a terminal-side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), an augmented reality (AR) or virtual reality (VR) device, a robot, a wearable device, a vehicular user equipment (VUE), a pedestrian user equipment (PUE), or a smart home (a home device having a wireless communication function, such as a refrigerator, a television, a washing machine, or furniture). The wearable device includes a smartwatch, a smart band, a smart headphone, smart glasses, smart jewelry (a smart bracelet, a smart wrist chain, a smart ring, a smart necklace, a smart anklet, a smart ankle chain, or the like), a smart wristband, smart clothing, a game console, or the like. It should be noted that a specific type of the terminal 11 is not limited in the embodiments of this application. The network-side device 12 may be a base station or a core network. The base station may be referred to as a NodeB, an evolved NodeB (eNB), an access point, a base transceiver station (BTS), a radio base station, a radio transceiver, a basic service set (BSS), an extended service set (ESS), a home NodeB, a home evolved NodeB, a WLAN access point, a Wi-Fi node, a transmission and reception point (TRP), or another appropriate term in the art. As long as the same technical effect is achieved, the base station is not limited to specific technical terms. It should be noted that in the embodiments of this application, only a base station in an NR system is used as an example, but a specific type of the base station is not limited.

In the embodiments of this application, a credential is information used to identify and authenticate a terminal in a network accessed by the terminal.

A credential holder is an entity to which the credential belongs, such as a home operator of the terminal, a service provider, or another third-party entity.

In an embodiment, the terminal supports access to a non-public network. The non-public network may provide a specific service only at a specific time or location. For example, a stadium holds a competition in a time period and provides a data transmission service.

The terminal can access an SNPN network based on an SNPN subscription or a PLMN subscription. If the terminal activates an SNPN access mode, the terminal can access only the SNPN network. If there is no suitable SNPN network for access in this case, the terminal cannot access other networks. Therefore, communication of the terminal is affected. Alternatively, the terminal can access a PNI-NPN based on the PLMN subscription. When the subscription of the terminal is configured to support only a closed access group (CAG), that is, the CAG only, the terminal can access only the PNI-NPN. If there is no suitable PNI-NPN network available for access in this case, the terminal cannot access a normal PLMN cell either, and communication of the terminal is affected.

For the foregoing different networks, an urgent problem to be resolved by a person skilled in the art is how a terminal selects a suitable network for access, so that communication of the terminal is not affected.

A network selection method provided in the embodiments of this application is hereinafter described in detail by using some embodiments and application scenarios thereof with reference to the accompanying drawings.

Figure 2:
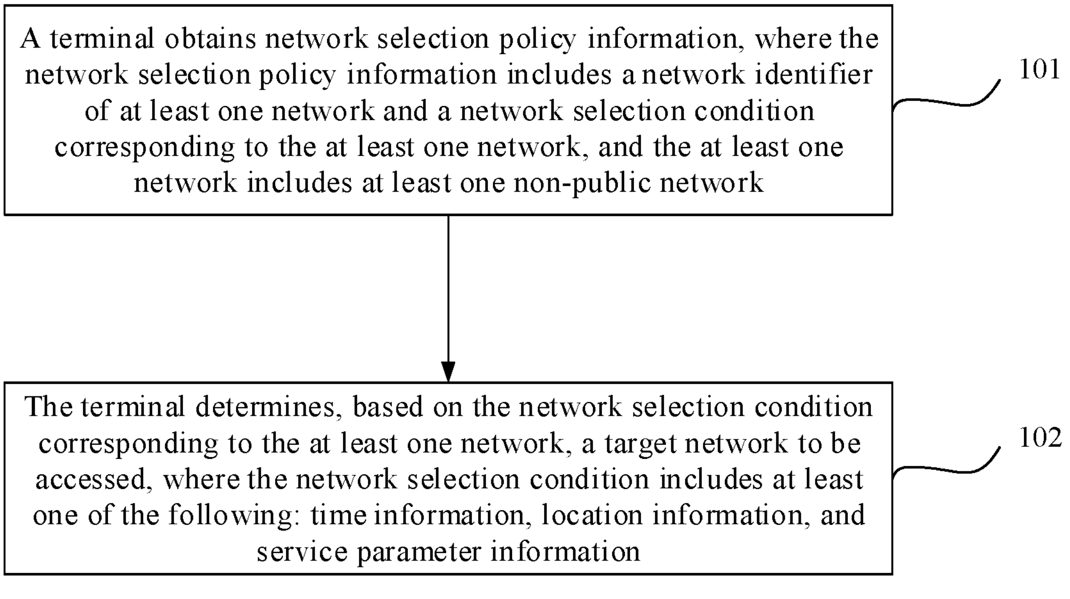
FIG. 2 is a first schematic flowchart of a network selection method according to an embodiment of this application.

FIG. 2 is a first schematic flowchart of a network selection method according to an embodiment of this application. As shown in FIG. 2, the network selection method provided in this embodiment includes the following steps.

Step 101: A terminal obtains network selection policy information, where the network selection policy information includes a network identifier of at least one network and a network selection condition corresponding to the at least one network, and the at least one network includes at least one non-public network.

Optionally, the network selection condition includes at least one of the following: time information, location information, and service parameter information.

Specifically, the terminal selects a network based on the network selection policy information, thereby accessing the selected network.

The network selection policy information includes the network identifier of the at least one network and the network selection condition. The network selection condition is applicable to one network or a plurality of networks, or applicable to all networks in the network selection policy information. For example, if each item in a network list controlled by a user includes an identifier of one network and a corresponding network selection condition, the network selection condition is applicable to the network; or if each item in a network list controlled by a user includes identifiers of a plurality of networks and corresponding network selection conditions, the network selection conditions are applicable to the corresponding plurality of networks; or if a network list controlled by a user includes identifiers of a plurality of networks and one network selection condition, the network selection condition is applicable to all the networks in the network list controlled by the user. When the network selection condition or an item in the network selection condition does not exist or is null, it indicates that the corresponding network is not restricted by the network selection condition or not restricted by the item in the network selection condition.

The network may be a public network and/or a non-public network, and optionally includes at least one of the following: a standalone non-public network SNPN, a public network integrated non-public network PNI-NPN, or a public network. Optionally, the public network is a PLMN.

Optionally, the terminal may obtain non-public network selection policy information and public network selection policy information separately, that is, the network selection policy information of the two networks may not be carried in a same information list, for example, is carried by two information lists. The network selection policy information of the two networks may be obtained in different places or from different messages, or may be obtained in a same place or from different information lists in a same message.

Optionally, the network selection policy information of the two networks may alternatively be carried in a same information list.

Optionally, the public network selection policy information and the non-public network selection policy information may be different.

The time information in the network selection condition indicates that the terminal can select the network at a time described by the time information. The location information indicates that the terminal can select the network when the terminal is at a location described by the location information. When the network selection condition includes both the time information and the location information, the terminal can select the network only when the time information and the location information are both met.

The service parameter information may include at least one of the following: a service identifier service ID, an application identifier App ID, traffic description, and the like. A service parameter indicates that the terminal can use the corresponding network to access a service indicated by the service parameter.

In one network selection condition, only one or more of a service parameter, time information, and location information may appear. The service parameter, the time information, and the location information may be carried in different parameters or placed in a same parameter. This is not limited in this application.

Optionally, the network selection policy information may further include a default network selection condition, and the default network selection condition has no corresponding network identifier. This means that when the terminal does not select any network indicated by network identifiers in the network selection policy information, if there is still a network that can be selected, and this network is a network that the terminal is allowed to access, but accessible networks configured for the terminal do not include this network, the default network selection condition may be used to determine whether this network meets the network selection condition.

It should be noted that the terminal may alternatively obtain the network selection policy information in different manners. For example, a network list controlled by the user, including network selection policy information, may be configured by the user for the terminal; or a network list controlled by a credential holder, including network selection policy information, may be obtained from a home operator. In a subsequent network selection process, the terminal can select a network based on a specific priority order and based on the network selection policy information obtained in different manners.

Step 102: The terminal determines, based on the network selection condition corresponding to the at least one network, a target network to be accessed.

In this embodiment of this application, determining a network may also be referred to as selecting a network.

Specifically, the terminal determines, in at least one network, whether there is a network meeting the corresponding network selection condition. If yes, the terminal determines that the network meeting the network selection condition is the target network, that is, selects the target network for access.

If a plurality of networks meet the network selection conditions, the target network may alternatively be selected based on priority information and/or signal measurement results of the plurality of networks.

Optionally, the target network includes at least one of the following: a standalone non-public network SNPN, a public network integrated non-public network PNI-NPN, or a public network.

The terminal may perform step 102 to select a public network or a non-public network. An execution order in which the terminal selects a public network or a non-public network is not limited, and the selection may be performed once or performed for a plurality of times respectively. This is not limited in this application.

Optionally, if the terminal does not select a non-public network, the terminal may continue to select a public network.

Optionally, if the terminal does not select a public network, the terminal may continue to select a non-public network.

Optionally, if the terminal selects a suitable non-public network, when a network selection condition of the non-public network is no longer met, the terminal selects a non-public network again according to the foregoing step.

Optionally, if the terminal selects a suitable non-public network, when a network selection condition of the non-public network is no longer met, the terminal selects a public network according to the foregoing step or a solution in a 3GPP protocol. Optionally, if the terminal does not select a suitable public network, the terminal reselects a non-public network according to the foregoing step.

Optionally, if the terminal selects a suitable public network, when a network selection condition of the public network is no longer met, the terminal selects a non-public network according to the foregoing step.

Optionally, if the terminal selects a suitable non-public network, the terminal may further continue to select a public network according to the foregoing step. If the terminal selects a suitable public network, the terminal may further continue to select a non-public network according to the foregoing step.

According to the method in this embodiment, the terminal selects, based on the network selection condition corresponding to the at least one network, the target network for access, where the at least one network includes at least one non-public network, and the network selection condition includes at least one of the following: the time information, the location information, and the service parameter information. According to this solution, in a scenario with a non-public network, the target network meeting the network selection condition is selected, that is, the target network can meet constraints of the time information, the location information, the service parameter information, and the like, that is, the terminal can select a suitable network for access, and accuracy of the network selection is high.

In an embodiment, before step 102, the method may further include:

activating a conditional non-public network access mode.

Specifically, before the target network is selected according to step 102, the conditional non-public network access mode may be activated. In the conditional non-public network access mode, the network selection process of step 102 is performed. For example, a non-public network and/or a public network may be selected for access.

In the conditional non-public network access mode, a type of the network selected for access is not limited. The network may be a non-public network or a public network. In other words, the network can be selected as long as the corresponding network selection condition is met.

It should be noted that the conditional non-public network access mode is merely a name and may also be replaced with another name, such as a first mode. This is not limited in this embodiment of this application.

Optionally, before step 102, the method may further include the following step:

activating a non-public network access mode, and determining that the target network to be accessed is a non-public network; or deactivating a non-public network access mode, and determining that the target network to be accessed is a public network.

Specifically, before a non-public network is selected, which means that the target network to be selected is a non-public network, the non-public network access mode is activated. For example, if the non-public network is an SNPN, an SNPN access mode is activated.

It is assumed that only a non-public network is allowed to be selected in the non-public network access mode. In this case, before a public network is selected, which means that the target network to be selected is a public network, the non-public network access mode is deactivated.

Optionally, the method may further include the following step:

when the network selection condition of the target network is no longer met, deactivating a non-public network access mode, where the target network is a non-public network, and further, the terminal performs step 102; or when the network selection condition of the target network is no longer met, activating a non-public network access mode, where the target network is a public network, and further, the terminal performs step 102.

Specifically, when the network selection condition of the selected or accessed target network is no longer met, a network meeting the network selection condition may be reselected and access may be attempted. For example, a public network or a non-public network may be selected. It is assumed that the current target network is a non-public network and that the terminal activates the non-public network access mode before selecting the target network. If only the non-public network can be accessed in the non-public network access mode, when the non-public network no longer meets the network selection condition and there is no other non-public network that can be selected, the terminal cannot select another public network for access, and communication of the terminal is affected. Therefore, when the terminal reselects a public network, the non-public network access mode can be deactivated. Optionally, the terminal may reselect another non-public network without deactivating the non-public network access mode. This is not limited in this embodiment of this application.

Assuming that the current target network (that is, the currently accessed or selected network) is a public network and that the reselected network is a non-public network, the non-public network access mode is activated first before the reselection. Optionally, if the target network is a public network and the reselected network is also a public network, the non-public network access mode does not need to be activated first before the reselection. This is not limited in this embodiment of this application.

In the foregoing implementation, the network selection can be limited by using an access mode.

Figure 3:
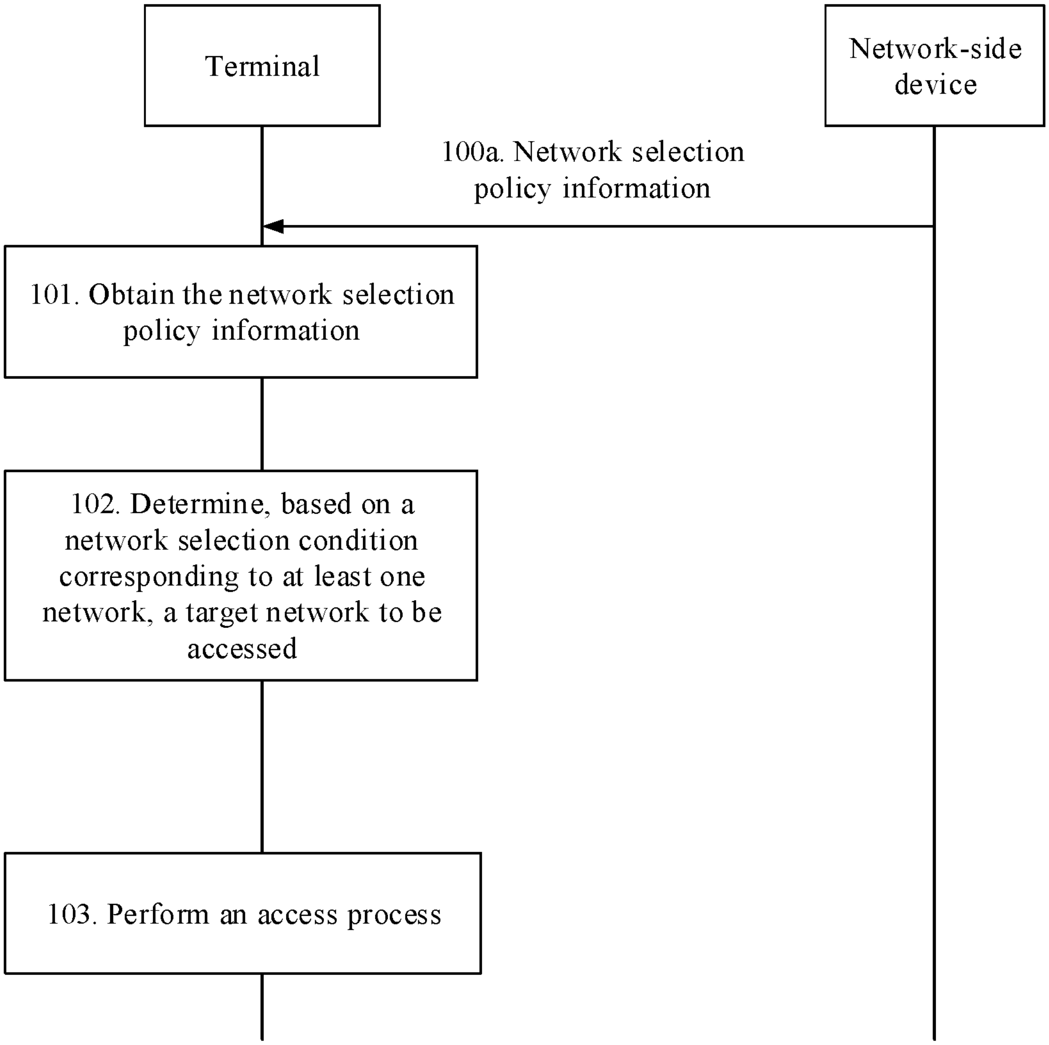
FIG. 3 is a first schematic interaction flowchart of a network selection method according to an embodiment of this application.

As shown in FIG. 3, an embodiment of this application provides a network selection method. The method includes the following steps.

Step 100*a*: A network-side device sends network selection policy information to a terminal.

Step 101: The terminal obtains the network selection policy information in step 100*a*.

Step 102: The terminal determines, based on a network selection condition corresponding to at least one network in the network selection policy information, a target network to be accessed.

For steps 101 and 102, refer to the foregoing description.

Step 103: The terminal performs an access process.

Optionally, the network selection policy information is carried by at least one of the following and sent by the network-side device to the terminal:

- a network list controlled by a user;
- a network list controlled by a credential holder;
- a group identifier GIN list controlled by the credential holder;
- a UE route selection policy URSP;
- a registration accept message;
- a session establishment accept message; and
- a non-access stratum NAS message.

Specifically, the network list controlled by the user includes information about a network that the user is allowed or inclined to select and a network selection condition. The information about the network may include an identifier of the network. Using an SNPN network as an example, an identifier of the SNPN network may include a PLMN ID and a network identifier (NID), and may optionally further include a GIN. Using a PNI-NPN network as an example, an identifier of the PNI-NPN network may include a CAG ID.

The network list controlled by the credential holder includes information about a network that the credential holder is allowed or inclined to select and a network selection condition. For the information about the network and the network selection condition, refer to the foregoing description.

Optionally, the GIN list may include priority information of a GIN. The GIN list includes a group identifier GIN of a group having a network that the credential holder is allowed or inclined to select and a network selection condition. For the network selection condition, refer to the foregoing description.

The URSP may include a network identifier and a network selection condition. For the network selection condition, refer to the description of the network selection condition in the foregoing embodiment.

Figure 4:
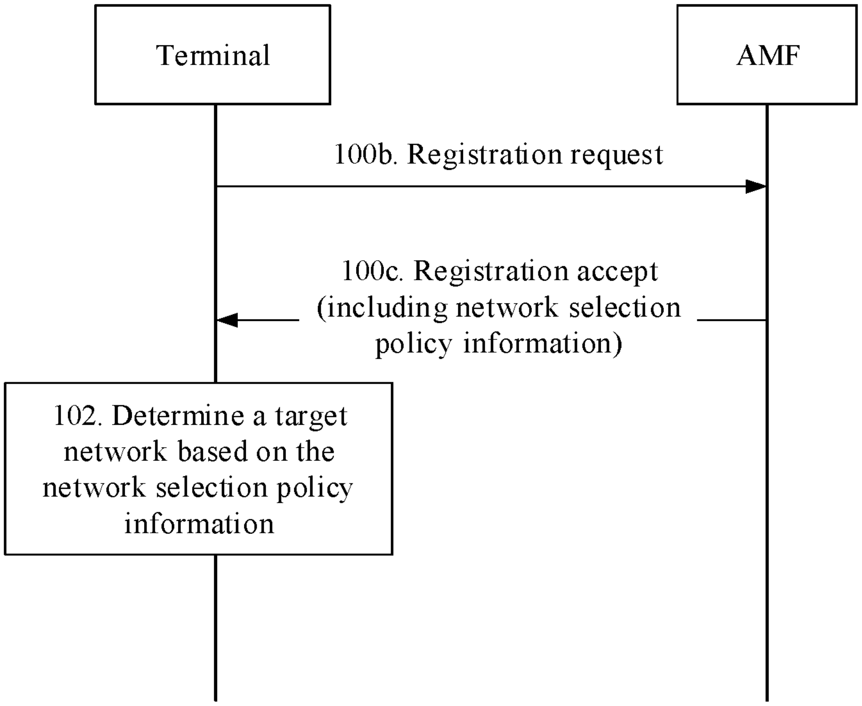
FIG. 4 is a second schematic interaction flowchart of a network selection method according to an embodiment of this application.

For example, assuming that a terminal device obtains network selection policy information in a registration process, as shown in FIG. 4, an embodiment of this application provides a network selection method. The method includes the following steps.

Step 100*b*: A terminal sends a registration request message to an Access and Mobility Management Function (AMF). The registration request message is used to request to register with the AMF.

Step 100*c*: The terminal receives a registration accept message from the AMF. The registration accept message may include network selection policy information.

Location information in a network selection condition may include at least one of the following: one or more cells (for example, represented by a cell list), one or more tracking areas (for example, represented by a tracking area (TA) list), one or more geographical locations (for example, represented by a Geo list), and one or more latitudes and longitudes (for example, represented by a list of longitudes and latitudes).

Optionally, the terminal may alternatively obtain network selection policy information in a session establishment process. The registration request message and the registration accept message in FIG. 4 may be correspondingly replaced with a session establishment request message and a session establishment accept message.

Optionally, the terminal may alternatively obtain network selection policy information by using other non-access stratum (NAS) messages. For example, the other NAS messages may include a downlink NAS transport message (DL NAS TRANSPORT message), a terminal configuration update command message, and the like.

Optionally, the network selection policy information may be preconfigured in the terminal or come from a network device in a home network of the terminal or a device of a service provider to which the terminal belongs. The network-side device may be, for example, a core network device or a base station.

The network selection policy information may be preconfigured in the terminal by a user, an operator, or the like.

In an embodiment, step 102 may be specifically implemented in the following manners.

One Manner:

The terminal determines, based on a first priority order, that a first network meeting a network selection condition is a target network, where

- the first priority order represents an order of priorities of networks.

Optionally, the priorities of the networks include priorities of at least two of the following: a network with which the terminal is previously registered, a network to which the terminal has subscribed, a network in a network list controlled by the user, a network in a network list controlled by a credential holder, a network in a group included in a group identifier GIN list controlled by the credential holder, and a second network, where the second network is a network that the terminal is allowed to access other than an accessible network configured for the terminal.

Specifically, the terminal sequentially determines, based on the first priority order, whether each network in the first priority order meets a corresponding network selection condition in the network selection policy and whether the network is a selectable network. If a network meets a corresponding network selection condition and the network is a selectable network, the terminal determines that the network is the target network.

In a specific implementation, that the terminal determines whether a network is a selectable network includes: the terminal searches for the network, and if the network can be found, determines that the network is a selectable network, or else, determines that the network is not a selectable network.

In another specific implementation, before determining the target network, the terminal obtains a currently selectable network. For example, the terminal may search for nearby networks and obtain a list of currently selectable networks. When the terminal determines, based on the first priority order, that a network meets a corresponding network selection condition and that the network is a currently selectable network, the terminal determines that the network is a selectable network, or else, determines that the network is not a selectable network.

The first priority order may be a descending order of priorities or an ascending order of priorities. In this embodiment, it is assumed that the first priority order is the descending order of priorities. For example, the network with which the terminal is previously registered has a first priority being a highest priority, the network to which the terminal has subscribed has a second priority, and so on. It should be noted that in an actual implementation of the network selection process, only some networks in the first priority order may be considered. For example, the network selection is performed based on the following order: the network in the network list controlled by the user, the network in the network list controlled by the credential holder, and the network in the group included in the group identifier GIN list controlled by the credential holder. Alternatively, the network selection is performed only based on the network in the network list controlled by the credential holder.

For example, the terminal first checks, based on the first priority order, whether the at least one network includes the network with which the terminal is previously registered; if the network with which the terminal is previously registered is included, the terminal determines whether the network meets a corresponding network selection condition; if the network does not meet the corresponding network selection condition, the terminal continues to select another network; if the at least one network does not include the network with which the terminal is previously registered, the terminal continues to search to determine whether there is a network with a next priority, that is, the network to which the terminal has subscribed, and if yes, checks whether a corresponding network selection condition is met; and so on, until a network meeting a network selection condition is found, or none of the networks meets the network selection conditions.

Optionally, if the terminal supports access to a network by using a credential of an authentication credential holder, the network side may broadcast that the network side supports access of the terminal using the credential of the authentication credential holder.

The terminal may select the network based on the following priorities and attempt access:

- the network in the network list controlled by the user;
- the network in the network list controlled by the credential holder;
- a network in a group corresponding to a GIN included in the GIN list controlled by the credential holder, where assuming that a network broadcasts a GIN corresponding to the network and the GIN includes the GIN in the GIN list controlled by the credential holder, the network falls into this type; and
- the second network, which is a network that the terminal is allowed to access other than the accessible network configured for the terminal. In other words, the network broadcasts that the terminal is allowed to access the network, but the accessible network configured for the terminal does not include this network, that is, the NID or GIN broadcast by the network is not in the network list controlled by the credential holder of the terminal. It should be noted that the second network may not be in the network selection policy information obtained by the terminal. In this case, the terminal can discover the second network only through search. Therefore, the second network is a currently selectable network.

Each item in the first priority order may relate to a plurality of networks. If there is a priority relationship among the plurality of networks, a selection is made among the plurality of networks based on the priority relationship. For example, the network list controlled by the user may include a plurality of networks, and the network list controlled by the user also indicates a priority relationship among the plurality of networks. In this case, when the terminal attempts to select a network in the network list controlled by the user, the terminal selects the network based on priorities in the network list controlled by the user, that is, the terminal sequentially determines, based on the priorities, whether the networks in the network list controlled by the user meet corresponding network selection conditions.

Optionally, if a plurality of networks are available and a same GIN is broadcast, the terminal may select one of the plurality of networks and attempt access. For example, the terminal randomly selects a network and attempts access. If the access fails, the terminal selects a next network and attempts access. That a network is available means that the network meets a corresponding network selection condition.

Optionally, the terminal may alternatively select a network based on a service that the terminal currently needs to use. For example, when the terminal needs to use a voice service, the terminal determines, based on the first priority order, whether a service parameter in a network selection condition of a network includes the voice service. If the voice service is included, the network selection condition of the network is currently met, and the network can be accessed.

In the foregoing implementation, the terminal determines, based on the first priority order of network priorities, that the first network meeting the network selection condition is the target network, so that a suitable network can be selected for access. For a network with a higher priority, a terminal access success rate is also higher. Therefore, accuracy and efficiency of the network selection are improved.

Optionally, when the network selection condition of the target network is no longer met, the terminal determines, based on the first priority order, a third network that meets the network selection condition, where the third network is a public network or a non-public network.

Specifically, when the network selection condition of the selected or accessed target network is no longer met, the third network may be reselected and access may be attempted. For example, a public network or a non-public network may be selected. The third network is a new target network. For a process of selecting the third network, refer to the foregoing description of the target network selection process.

Assuming that the current target network is a non-public network, the reselected network may be a public network or a non-public network. This is not limited in this embodiment of this application.

Assuming that the current target network is a public network, the reselected network may be a non-public network or a public network. This is not limited in this embodiment of this application.

Optionally, the method further includes:

the terminal determines, based on the first priority order, a fourth network to be accessed that meets the network selection condition, where if the target network selected according to the foregoing target network selection process is a non-public network, the fourth network is a public network; or if the target network selected according to the foregoing target network selection process is a public network, the fourth network is a non-public network.

Specifically, after selecting one target network, the terminal may further select another network for access. In other words, the terminal can access different networks at the same time. For example, the terminal accesses a non-public network and a public network at the same time.

Assuming that the current target network is a non-public network, a public network may be further selected for access, or if the current target network is a public network, a non-public network is selected for access. For a process of selecting a public network, refer to the foregoing target network selection process or descriptions in a 3GPP protocol. For a process of selecting a non-public network, refer to the foregoing description of the target network selection process.

Another Manner:

The terminal determines, based on a second priority order included in a UE route selection policy (URSP), that a first network meeting a network selection condition is a target network, where the second priority order represents an order of priorities of networks.

Specifically, the terminal sequentially determines, based on the second priority order, whether a plurality of networks selectable by the terminal meet corresponding network selection conditions. If a network meets a corresponding network selection condition, the terminal determines that the network is the target network.

The second priority order may be a descending order of priorities or an ascending order of priorities. The second priority order is a priority order of the plurality of networks selectable by the terminal.

For example, the URSP includes a network identifier and a network selection condition. For the network selection condition, refer to the description of the network selection condition in the foregoing embodiment. When a network selection condition of a network is met, the network indicated by the network identifier may be selected. For example, when a time condition and/or a location condition included in the network selection condition are/is met and the terminal uses a service indicated by a service parameter in the network selection condition, the corresponding network may be selected.

It may also be understood that the network selection condition describes access information of the network. For example, the network is accessible or effective at a corresponding time and/or location, and the network supports the service indicated by the corresponding service parameter.

Optionally, the URSP may include a priority list, and the priority list indicates a priority order of networks. For example, in the priority list, classification is performed based on services supported by the networks, and each type describes a network corresponding to a specific service, as well as a network selection condition, and a plurality of types are based on an order of priorities. Optionally, if a type includes a plurality of networks, priority information of the plurality of networks may also be included. Optionally, there may be one or more network selection conditions in each type, or only one network selection condition may be included in the priority list.

For example, the terminal determines, based on the priority list in the URSP and the second priority order indicated by the priority list in the URSP, whether network selection conditions of the plurality of networks selectable by the terminal are met. If a network selection condition of a current network is met, the terminal attempts to access the network; otherwise, the terminal determines whether a network selection condition of a network with a next priority is met.

For example, if the terminal currently needs to use a specific service, the terminal determines the network selection conditions of the plurality of networks based on the second priority order indicated by the URSP. If the network selection condition of the current network includes the specific service, and other conditions in the network selection condition are met, the terminal attempts to access the network; otherwise, the terminal determines whether a network selection condition of a next network with this priority or a network with a next priority is met.

Optionally, when the network selection condition of the target network is no longer met, the terminal determines, based on the second priority order, a third network that meets the network selection condition, where the third network is a public network or a non-public network.

Specifically, when the network selection condition of the selected or accessed target network is no longer met, the third network meeting the network selection condition may be reselected and access may be attempted. For example, a public network or a non-public network may be selected. The third network is a new target network.

Assuming that the current target network is a non-public network, the reselected network may be a public network or a non-public network. This is not limited in this embodiment of this application.

Assuming that the current target network is a public network, the reselected network may be a non-public network or a public network. This is not limited in this embodiment of this application.

Optionally, the method further includes:

the terminal determines, based on the second priority order, a fourth network to be accessed that meets the network selection condition, where if the target network selected according to the foregoing target network selection process is a non-public network, the fourth network is a public network; or if the target network selected according to the foregoing target network selection process is a public network, the fourth network is a non-public network.

Specifically, after selecting one target network, the terminal may further select another network for access. In other words, the terminal can access different networks at the same time. For example, the terminal accesses a non-public network and a public network at the same time.

Assuming that the current target network is a non-public network, a public network may be further selected for access based on the second priority order, or if the current target network is a public network, a non-public network may be further selected for access based on the second priority order.

Optionally, the first priority order and the second priority order may be used to select a non-public network only. The solution of this application in which a public network is selected based on the first priority order or the second priority order may be replaced with a solution in which a public network is selected based on obtained public network selection policy information, or replaced with a public network selection solution described in the 3GPP protocol.

In the foregoing implementation, the terminal determines, based on the second priority order of network priorities, that the first network meeting the network selection condition is the target network, so that a suitable network can be selected for access. For a network with a higher priority, a terminal access success rate is also higher. Therefore, efficiency and accuracy of the network selection are improved.

Optionally, there are a plurality of first networks, and the determining that a first network meeting a network selection condition is a target network may be specifically implemented in the following manner.

The terminal determines the target network based on signal measurement results of the plurality of first networks; and/or the terminal determines the target network based on priority information of the plurality of first networks.

Specifically, if a plurality of first networks meet the network selection condition, the terminal may determine a final target network based on signal measurement results of the plurality of networks and attempt access. For example, a network with best signal quality is selected as the target network.

Alternatively, the terminal may determine a final target network based on priority information of a plurality of networks and attempt access. For example, a network with a highest priority is selected as the target network.

Alternatively, a final target network may be determined by comprehensively considering signal measurement results and priorities. Assuming that a network with a highest priority has a poor signal measurement result, a network with a next highest priority may be selected as the target network.

In the foregoing implementation, when many first networks meet the network selection condition, the target network to be accessed may be determined based on the signal measurement results and/or priority information of the plurality of first networks, and complexity of processing logic is low.

In an embodiment, the network selection condition includes location information. If location information in a network selection condition of a fifth network includes a target area, before the determining that a first network meeting a network selection condition is a target network, the method further includes:

when the terminal is located in the target area, the terminal determines that the fifth network is the first network meeting the network selection condition.

Specifically, if the location information in the network selection condition of the fifth network is the target area, when the terminal moves to the specific target area, the network selection condition of the fifth network is met, and the fifth network is used as the first network.

Optionally, the fifth network is one or more of a plurality of networks selectable by the user, and the fifth network is, for example, a network in a network list.

Optionally, the first network is a non-public network, and when the terminal moves out of the target area, the terminal selects a public network.

Optionally, step 101 may be implemented in the following manner:

The terminal obtains URSPs from a plurality of service providers; and the terminal obtains the network selection policy information based on priority information of the plurality of URSPs.

Specifically, the URSPs may be obtained from the plurality of service providers (SP). For example, the URSPs may be obtained from a PLMN SP and an SNPN SP. The terminal may obtain the network selection policy information based on priorities of these URSPs, and then select the target network.

In a possible implementation, the priority information of the plurality of URSPs includes: a priority of a URSP of a service provider corresponding to the home network of the terminal is higher than priorities of URSPs of other service providers.

Specifically, the terminal preferentially selects a network based on the URSP provided by the service provider corresponding to the home network of the terminal.

In the foregoing implementation, the terminal obtains the network selection policy information based on the priority information of the plurality of URSPs, and then selects a suitable network for access based on the network selection policy information. Complexity of the processing logic is low.

In an embodiment, as shown in FIG. 3, a network selection method provided in this embodiment includes the following step.

Step 100: A network-side device sends network selection policy information to a terminal, where the network selection policy information includes a network identifier of at least one network and a network selection condition corresponding to the at least one network, the at least one network includes at least one non-public network, the network selection condition corresponding to the at least one network is used by the terminal to determine a target network to be accessed, and the network selection condition includes at least one of the following: time information, location information, and service parameter information.

Optionally, the method further includes:

the network-side device receives an access request sent by the terminal and performs access processing based on the access request.

Optionally, the network selection policy information is carried by at least one of the following:

a network list controlled by a user;

a network list controlled by a credential holder;

a group identifier GIN list controlled by the credential holder;

a UE route selection policy URSP;

a registration accept message;

a session establishment accept message; and a non-access stratum NAS message.

Optionally, the target network includes at least one of the following: a standalone non-public network SNPN, a public network integrated non-public network PNI-NPN, or a public network.

A specific implementation process and technical effect in the foregoing implementation are similar to those in the terminal-side method embodiment. For details, refer to the detailed descriptions in the terminal-side embodiment. Details are not described herein again.

It should be noted that the network selection method provided in this embodiment of this application may be performed by a network selection apparatus, or a processing module for performing the network selection method in the network selection apparatus. A network selection apparatus provided in an embodiment of this application is described by assuming that the network selection method in this embodiment of this application is performed by the network selection apparatus.

Figure 5:
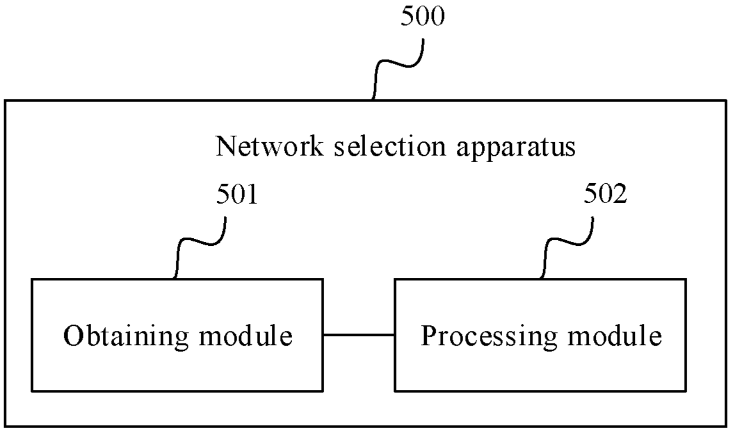
FIG. 5 is a first schematic structural diagram of a network selection apparatus according to an embodiment of this application.

FIG. 5 is a first schematic structural diagram of a network selection apparatus according to an embodiment of this application. As shown in FIG. 5, the network selection apparatus 500 provided in this embodiment includes:

an obtaining module 501, configured to obtain network selection policy information, where the network selection policy information includes a network identifier of at least one network and a network selection condition corresponding to the at least one network, and the at least one network includes at least one non-public network; and a processing module 502, configured to determine, based on the network selection condition corresponding to the at least one network, a target network to be accessed, where the network selection condition includes at least one of the following: time information, location information, and service parameter information.

In this embodiment, the processing module selects, based on the network selection condition corresponding to the at least one network, the target network for access, where the at least one network includes at least one non-public network, and the network selection condition includes at least one of the following: the time information, the location information, and the service parameter information. According to this solution, in a scenario with a non-public network, the target network meeting the network selection condition is selected, that is, the target network can meet constraints of the time information, the location information, the service parameter information, and the like, that is, the terminal can select a suitable network for access, and accuracy of the network selection is high.

Optionally, the processing module 502 is specifically configured to:

determine, based on a first priority order, that a first network meeting the network selection condition is the target network, where the first priority order represents an order of priorities of networks, and the priorities of the networks include priorities of at least two of the following: a network with which the terminal is previously registered, a network to which the terminal has subscribed, a network in a network list controlled by a user, a network in a network list controlled by a credential holder, a network in a group included in a group identifier GIN list controlled by the credential holder, and a second network, where the second network is a network allowed to be accessed other than an accessible network configured for the terminal.

Optionally, the processing module 502 is specifically configured to:

determine, based on a second priority order included in a UE route selection policy URSP, that a first network meeting the network selection condition is the target network, where the second priority order represents an order of priorities of networks.

Optionally, there are a plurality of first networks, and the processing module 502 is specifically configured to:

determine the target network based on signal measurement results of the plurality of first networks; and/or determine the target network based on priority information of the plurality of first networks.

Optionally, the processing module 502 is further configured to:

when the network selection condition of the target network is no longer met, determine, based on the first priority order, a third network that meets the network selection condition, where the third network is a public network or a non-public network.

Optionally, the processing module 502 is further configured to:

when the network selection condition of the target network is no longer met, determine, based on the second priority order, a third network that meets the network selection condition, where the third network includes a public network or a non-public network.

Optionally, the processing module 502 is further configured to:

if the target network is a non-public network, determine, based on the first priority order, a fourth network to be accessed that meets the network selection condition, where the fourth network is a public network; or if the target network is a public network, determine, based on the first priority order, a fourth network to be accessed that meets the network selection condition, where the fourth network is a non-public network.

Optionally, the processing module 502 is further configured to:

if the target network is a non-public network, determine, based on the second priority order, a fourth network to be accessed that meets the network selection condition, where the fourth network is a public network; or if the target network is a public network, determine, based on the second priority order, a fourth network to be accessed that meets the network selection condition, where the fourth network is a non-public network.

Optionally, the network selection policy information is carried by at least one of the following:

the network list controlled by the user;

the network list controlled by the credential holder;

the group identifier GIN list controlled by the credential holder;

the UE route selection policy URSP;

a registration accept message;

a session establishment accept message; and a non-access stratum NAS message.

Optionally, the processing module 502 is further configured to:

activate a conditional non-public network access mode.

Optionally, the processing module 502 is further configured to:

activate a non-public network access mode, and determine that the target network to be accessed is a non-public network; or deactivate a non-public network access mode, and determine that the target network to be accessed is a public network.

Optionally, the processing module 502 is further configured to:

when the network selection condition of the target network is no longer met, deactivate a non-public network access mode, where the target network is a non-public network; or when the network selection condition of the target network is no longer met, activate a non-public network access mode, where the target network is a public network.

Optionally, the network selection condition includes the location information, location information in a network selection condition of a fifth network includes a target area, and the processing module 502 is further configured to:

when the terminal is located in the target area, determine that the fifth network is the first network meeting the network selection condition.

Optionally, the target network includes at least one of the following: a standalone non-public network SNPN, a public network integrated non-public network PNI-NPN, or a public network.

Optionally, the network selection policy information is preconfigured in the terminal or comes from a network device in a home network of the terminal or a device of a service provider to which the terminal belongs.

Optionally, the obtaining module 501 is specifically configured to:

obtain URSPs from a plurality of service providers; and obtain the network selection policy information based on priority information of the plurality of URSPs.

Optionally, the priority information of the plurality of URSPs includes: a priority of a URSP of a service provider corresponding to a home network of the terminal is higher than priorities of URSPs of other service providers.

The apparatus in this embodiment may be configured to perform the method in any one of the foregoing terminal-side method embodiments. A specific implementation process and technical effect thereof are similar to those in the terminal-side method embodiment. For details, refer to the detailed descriptions in the terminal-side method embodiment. Details are not described herein again.

Figure 6:
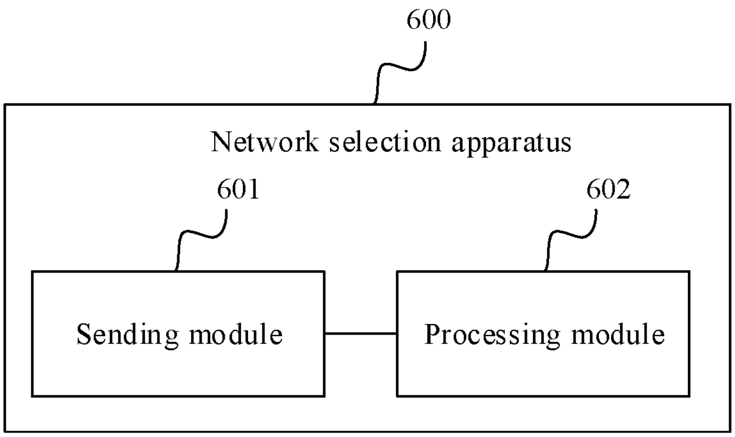
FIG. 6 is a second schematic structural diagram of a network selection apparatus according to an embodiment of this application.

FIG. 6 is a second schematic structural diagram of a network selection apparatus according to an embodiment of this application. As shown in FIG. 6, the network selection apparatus 600 provided in this embodiment includes:

a sending module 601, configured to send network selection policy information to a terminal, where the network selection policy information includes a network identifier of at least one network and a network selection condition corresponding to the at least one network, the at least one network includes at least one non-public network, the network selection condition corresponding to the at least one network is used by the terminal to determine a target network to be accessed, and the network selection condition includes at least one of the following: time information, location information, and service parameter information.

Optionally, the apparatus further includes a processing module 602, configured to perform access processing based on an access request of the terminal.

Optionally, the network selection policy information is carried by at least one of the following:

a network list controlled by a user;

a network list controlled by a credential holder;

a group identifier GIN list controlled by the credential holder;

a UE route selection policy URSP;

a registration accept message;

a session establishment accept message; and a non-access stratum NAS message.

Optionally, the target network includes at least one of the following: a standalone non-public network SNPN, a public network integrated non-public network PNI-NPN, or a public network.

The apparatus in this embodiment may be configured to perform the method in any one of the foregoing network-side method embodiments. A specific implementation process and technical effect thereof are similar to those in the network-side method embodiment. For details, refer to the detailed descriptions in the network-side method embodiment. Details are not described herein again.

The network selection apparatus in this embodiment of this application may be an apparatus, or an apparatus or an electronic device with an operating system, or may be a component, an integrated circuit, or a chip in a terminal. The apparatus or the electronic device may be a mobile terminal, or may be a nonmobile terminal. For example, the mobile terminal may include but is not limited to the foregoing illustrated type of the terminal 11. The nonmobile terminal may be a server, a network attached storage (NAS), a personal computer (PC), a television (TV), a teller machine, a self-service machine, or the like. This is not specifically limited in this embodiment of this application.

The network selection apparatus provided in this embodiment of this application can implement each process implemented by the method embodiments in FIG. 2 to FIG. 4, with the same technical effect achieved. To avoid repetition, details are not described herein again.

Figure 7:
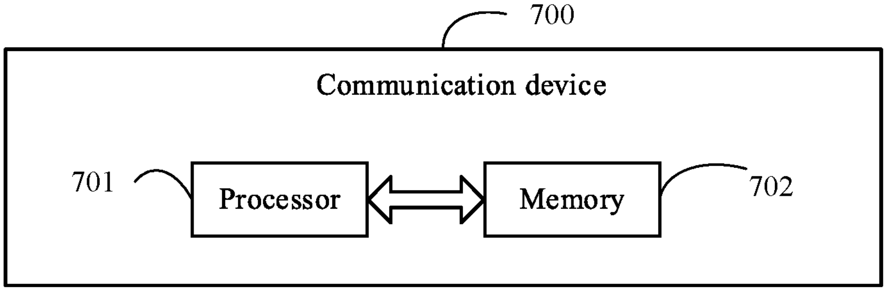
FIG. 7 is a schematic structural diagram of a communication device according to an embodiment of this application.

Optionally, as shown in FIG. 7, an embodiment of this application further provides a communication device 700, including a processor 701, a memory 702, and a program or instructions stored in the memory 702 and capable of running on the processor 701. For example, when the communication device 700 is a terminal, and the program or instructions are executed by the processor 701, each process of the foregoing network selection method embodiment is implemented, with the same technical effect achieved. When the communication device 700 is a network-side device, and the program or instructions are executed by the processor 701, each process of the foregoing network selection method embodiment is implemented, with the same technical effect achieved. To avoid repetition, details are not described herein again.

Figure 8:
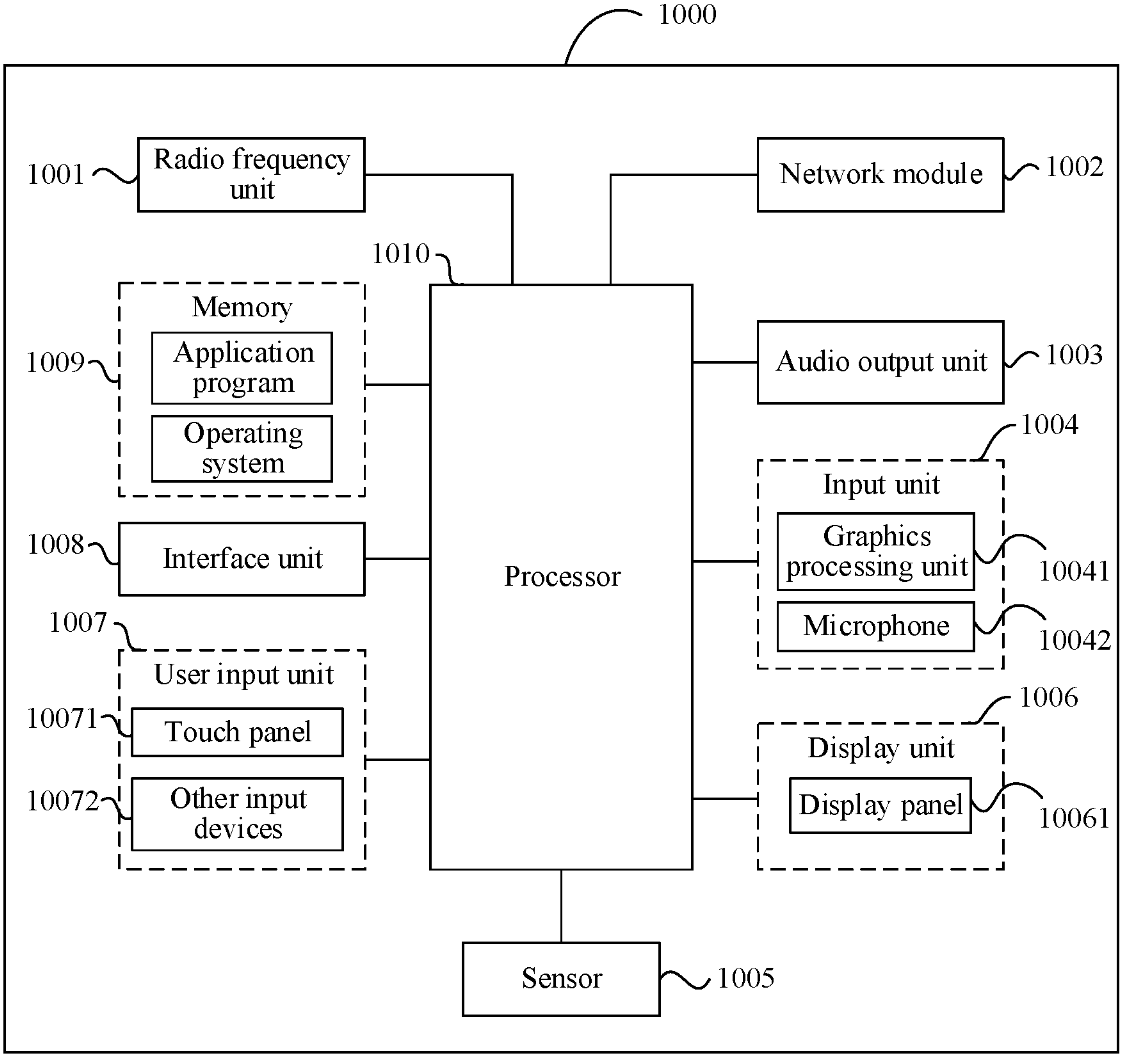
FIG. 8 is a schematic diagram of a hardware structure of a terminal according to an embodiment of this application.

An embodiment of this application further provides a terminal, including a processor and a communication interface. The communication interface is configured to obtain network selection policy information, where the network selection policy information includes a network identifier of at least one network and a network selection condition corresponding to the at least one network, and the at least one network includes at least one non-public network. The processor is configured to determine, based on the network selection condition corresponding to the at least one network, a target network to be accessed, where the network selection condition includes at least one of the following: time information, location information, and service parameter information. The terminal embodiment corresponds to the foregoing terminal-side method embodiment, and each implementation process and implementation of the foregoing method embodiment can be applied to the terminal embodiment, with the same technical effect achieved. Specifically, FIG. 8 is a schematic diagram of a hardware structure of a terminal for implementing an embodiment of this application.

The terminal 1000 includes but is not limited to at least some components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

A person skilled in the art may understand that the terminal 1000 may further include a power supply (for example, a battery) supplying power to all components. The power supply may be logically connected to the processor 1010 through a power management system. In this way, functions such as charge management, discharge management, and power consumption management are implemented by using the power management system. The terminal structure shown in FIG. 8 does not constitute a limitation on the terminal. The terminal may include more or fewer components than those shown in the figure, or some components are combined, or component arrangements are different. Details are not described herein again.

It should be understood that, in this embodiment of this application, the input unit 1004 may include a graphics processing unit (GPU) 10041 and a microphone 10042. The graphics processing unit 10041 processes image data of a still picture or video obtained by an image capture apparatus (such as a camera) in a video capture mode or an image capture mode. The display unit 1006 may include a display panel 10061, and the display panel 10061 may be configured in a form of a liquid crystal display, an organic light-emitting diode, or the like. The user input unit 1007 includes a touch panel 10071 and other input devices 10072. The touch panel 10071 is also referred to as a touchscreen. The touch panel 10071 may include two parts: a touch detection apparatus and a touch controller. The other input devices 10072 may include but are not limited to a physical keyboard, a function button (such as a volume control button or a power button), a trackball, a mouse, and a joystick. Details are not described herein again.

In this embodiment of this application, after receiving downlink data from a network-side device, the radio frequency unit 1001 sends the downlink data to the processor 1010 for processing, and in addition, sends uplink data to the network-side device. Generally, the radio frequency unit 1001 includes but is not limited to an antenna, at least one amplifier, a transceiver, a coupler, a low noise amplifier, a duplexer, and the like.

The memory 1009 may be configured to store software programs or instructions and various data. The memory 1009 may primarily include a program or instruction storage area and a data storage area. The program or instruction storage area may store an operating system, an application program or an instruction (such as an audio play function and an image play function) required by at least one function, and the like. In addition, the memory 1009 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or another non-volatile solid-state storage device.

The processor 1010 may include one or more processing units. Optionally, the processor 1010 may integrate an application processor and a modem processor. The application processor mainly processes the operating system, a user interface, an application program or an instruction, and the like. The modem processor mainly processes wireless communication. For example, the modem processor is a baseband processor. It may be understood that the modem processor may alternatively not be integrated in the processor 1010.

The interface unit 1008 is configured to obtain network selection policy information, where the network selection policy information includes a network identifier of at least one network and a network selection condition corresponding to the at least one network, and the at least one network includes at least one non-public network.

The processor 1010 is configured to determine, based on the network selection condition corresponding to the at least one network, a target network to be accessed, where the network selection condition includes at least one of the following: time information, location information, and service parameter information.

In this embodiment, the processor 1010 selects, based on the network selection condition corresponding to the at least one network, a suitable target network for access, where the at least one network includes at least one non-public network, and the network selection condition includes at least one of the following: the time information, the location information, and the service parameter information. According to this solution, in a scenario with a non-public network, the target network meeting the network selection condition is selected, that is, the target network can meet constraints of the time information, the location information, the service parameter information, and the like, that is, the terminal can select a suitable network for access, and accuracy of the network selection is high.

Optionally, the processor 1010 is specifically configured to:

determine, based on a first priority order, that a first network meeting the network selection condition is the target network, where the first priority order represents an order of priorities of networks, and the priorities of the networks include priorities of at least two of the following: a network with which the terminal is previously registered, a network to which the terminal has subscribed, a network in a network list controlled by a user, a network in a network list controlled by a credential holder, a network in a group included in a group identifier GIN list controlled by the credential holder, and a second network, where the second network is a network allowed to be accessed by a terminal that is not configured to access the second network.

Optionally, the processor 1010 is specifically configured to:

determine, based on a second priority order included in a UE route selection policy URSP, that a first network meeting the network selection condition is the target network, where the second priority order represents an order of priorities of networks.

Optionally, there are a plurality of first networks, and the processor 1010 is specifically configured to:

determine the target network based on signal measurement results of the plurality of first networks; and/or determine the target network based on priority information of the plurality of first networks.

Optionally, the processor 1010 is further configured to:

when the network selection condition of the target network is no longer met, determine, based on the first priority order, a third network that meets the network selection condition, where the third network is a public network or a non-public network.

Optionally, the processor 1010 is further configured to:

when the network selection condition of the target network is no longer met, determine, based on the second priority order, a third network that meets the network selection condition, where the third network includes a public network or a non-public network.

Optionally, the processor 1010 is further configured to:

if the target network is a non-public network, determine, based on the first priority order, a fourth network to be accessed that meets the network selection condition, where the fourth network is a public network; or if the target network is a public network, determine, based on the first priority order, a fourth network to be accessed that meets the network selection condition, where the fourth network is a non-public network.

Optionally, the processor 1010 is further configured to:

if the target network is a non-public network, determine, based on the second priority order, a fourth network to be accessed that meets the network selection condition, where the fourth network is a public network; or if the target network is a public network, determine, based on the second priority order, a fourth network to be accessed that meets the network selection condition, where the fourth network is a non-public network.

In the foregoing implementation, the terminal determines, based on the first priority order or second priority order of network priorities, that the first network meeting the network selection condition is the target network, so that a suitable network can be selected for access. For a network with a higher priority, a terminal access success rate is also higher. Therefore, accuracy and efficiency of the network selection are improved.

Optionally, the network selection policy information is carried by at least one of the following:

the network list controlled by the user;

the network list controlled by the credential holder;

the group identifier GIN list controlled by the credential holder;

the UE route selection policy URSP;

a registration accept message;

a session establishment accept message; and a non-access stratum NAS message.

Optionally, the processor 1010 is further configured to: activate a conditional non-public network access mode.

Optionally, the processor 1010 is further configured to:

activate a non-public network access mode, and determine that the target network to be accessed is a non-public network; or deactivate a non-public network access mode, and determine that the target network to be accessed is a public network.

Optionally, the processor 1010 is further configured to:

when the network selection condition of the target network is no longer met, deactivate a non-public network access mode, where the target network is a non-public network; or when the network selection condition of the target network is no longer met, activate a non-public network access mode, where the target network is a public network.

Optionally, the network selection condition includes the location information, location information in a network selection condition of a fifth network includes a target area, and the processor 1010 is further configured to:

when the terminal is located in the target area, determine that the fifth network is the first network meeting the network selection condition.

Optionally, the target network includes at least one of the following: a standalone non-public network SNPN, a public network integrated non-public network PNI-NPN, or a public network.

Optionally, the network selection policy information is preconfigured in the terminal or comes from a network device in a home network of the terminal or a device of a service provider to which the terminal belongs.

Optionally, the interface unit 1008 is specifically configured to:

obtain URSPs from a plurality of service providers; and obtain the network selection policy information based on priority information of the plurality of URSPs.

Optionally, the priority information of the plurality of URSPs includes: a priority of a URSP of a service provider corresponding to a home network of the terminal is higher than priorities of URSPs of other service providers.

In the foregoing implementation, when many first networks meet the network selection condition, the target network to be accessed may be determined based on the signal measurement results and/or priority information of the plurality of first networks, and complexity of processing logic is low.

An embodiment of this application further provides a network-side device, including a processor and a communication interface. The communication interface is configured to send network selection policy information to a terminal, where the network selection policy information includes a network identifier of at least one network and a network selection condition corresponding to the at least one network, the at least one network includes at least one non-public network, the network selection condition corresponding to the at least one network is used by the terminal to determine a target network to be accessed, and the network selection condition includes at least one of the following: time information, location information, and service parameter information. The network-side device embodiment corresponds to the foregoing method embodiment of the network-side device, and each implementation process and implementation of the foregoing method embodiment can be applied to the network-side device embodiment, with the same technical effect achieved.

Figure 9:
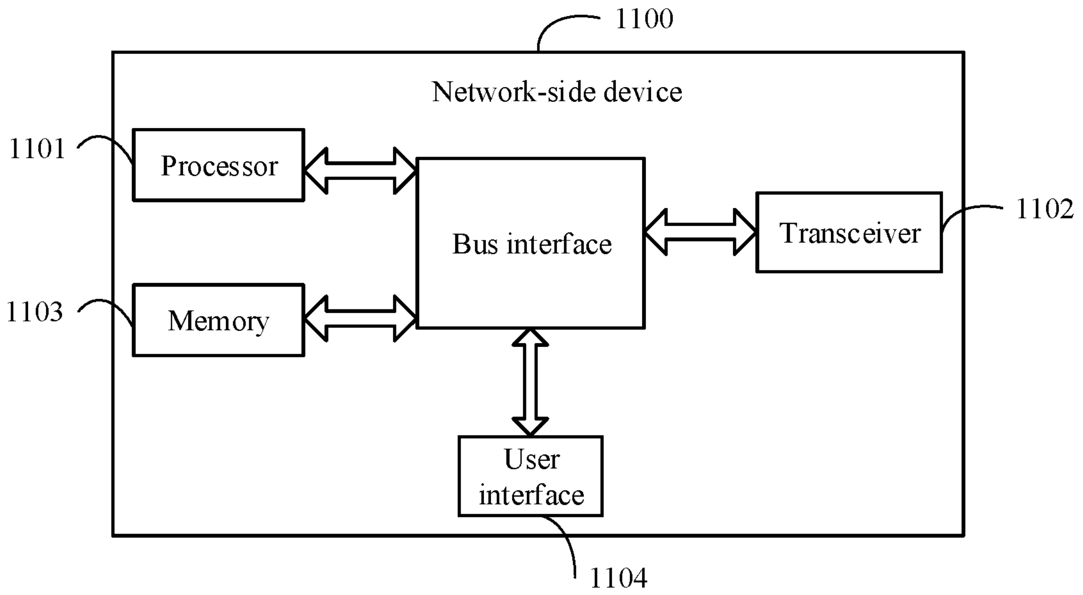
FIG. 9 is a schematic structural diagram of a network-side device according to an embodiment of this application.

Specifically, an embodiment of this application further provides a network-side device. As shown in FIG. 9, the network-side device 1100 includes a processor 1101 and a memory 1103. Optionally, the apparatus may further include a transceiver 1102, a user interface 1104, and a bus interface.

In this embodiment of the present invention, the network-side device 1100 further includes a computer program stored in the memory 1103 and capable of running on the processor 1101. The computer program is executed by the processor 1101 to perform the method performed by each module shown in FIG. 6, with the same technical effect achieved. To avoid repetition, details are not described herein again.

In FIG. 9, a bus architecture may include any quantity of interconnected buses and bridges, and specifically connects together circuits that are of one or more processors represented by the processor 1101 and of a memory represented by the memory 1103. The bus architecture may further interconnect various other circuits such as a peripheral device, a voltage regulator, and a power management circuit. These are all well known in the art, and therefore are not further described in this specification. The bus interface provides an interface. The transceiver 1102 may be a plurality of components, including a transmitter and a receiver, and provides units for communicating with a variety of other apparatuses on a transmission medium. For different user equipments, the user interface 1104 may also be an interface that can be externally or internally connected to a required device. The connected device includes but is not limited to a keypad, a display, a speaker, a microphone, a joystick, and the like.

The processor 1101 is responsible for management of the bus architecture and general processing, and the memory 1103 is capable of storing data that is used by the processor 1101 during operation.

An embodiment of this application further provides a readable storage medium. The readable storage medium stores a program or instructions. When the program or instructions are executed by a processor, each process of the foregoing network selection method embodiment is implemented, with the same technical effect achieved. To avoid repetition, details are not described herein again.

The processor is a processor in the terminal in the foregoing embodiment. The readable storage medium includes a computer-readable storage medium, for example, a computer read-only memory (ROM), a random access memory (RAM), a magnetic disk, or an optical disc.

In addition, an embodiment of this application provides a chip. The chip includes a processor and a communication interface. The communication interface is coupled to the processor. The processor is configured to run a program or instructions to implement each process of the foregoing network selection method embodiment, with the same technical effect achieved. To avoid repetition, details are not described herein again.

It should be understood that the chip provided in this embodiment of this application may also be referred to as a system-level chip, a system chip, a chip system, a system-on-chip, or the like.

An embodiment of this application further provides a computer program or program product. The computer program or program product is stored in a non-transitory storage medium. The program or program product is executed by at least one processor to implement each process of the foregoing network selection method embodiment, with the same technical effect achieved. To avoid repetition, details are not described herein again.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary general hardware platform, and certainly may alternatively be implemented by using hardware. However, in most cases, the former is a preferred implementation. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. Inspired by this application, a person of ordinary skill in the art may develop many other manners without departing from principles of this application and the protection scope of the claims, and all such manners fall within the protection scope of this application.

What is claimed is:

1. A network selection method, comprising:

obtaining, by a terminal, network selection policy information, wherein the network selection policy information comprises a network identifier of at least one network and a network selection condition corresponding to the at least one network, and the at least one network comprises at least one non-public network; and determining, by the terminal based on the network selection condition corresponding to the at least one network, a target network to be accessed, wherein the network selection condition comprises at least one of the following: time information, or location information, wherein the determining, by the terminal based on the network selection condition corresponding to the at least one network, a target network to be accessed comprises:

determining, by the terminal based on a first priority order, that a first network meeting the network selection condition is the target network, wherein the first priority order represents an order of priorities of networks, and the priorities of the networks comprise priorities of at least two of the following: a network with which the terminal is previously registered, a network to which the terminal has subscribed, a network in a network list controlled by a user, a network in a network list controlled by a credential holder, a network in a group comprised in a group identifier GIN list controlled by the credential holder, and a second network, wherein the second network is a network allowed to be accessed other than an accessible network configured for the terminal.

2. The network selection method according to claim 1, wherein the determining, by the terminal based on the network selection condition corresponding to the at least one network, a target network to be accessed comprises:

determining, by the terminal based on a second priority order comprised in a UE route selection policy (URSP), that a first network meeting the network selection condition is the target network, wherein the second priority order represents an order of priorities of networks.

3. The network selection method according to claim 1, wherein there are a plurality of first networks, and the determining that a first network meeting the network selection condition is the target network comprises:

determining, by the terminal, the target network based on signal measurement results of the plurality of first networks; and/or determining, by the terminal, the target network based on priority information of the plurality of first networks.

4. The network selection method according to claim 1, wherein the method further comprises:

when the network selection condition of the target network is no longer met, determining, by the terminal based on the first priority order, a third network that meets the network selection condition, wherein the third network is a public network or a non-public network.

5. The network selection method according to claim 2, wherein the method further comprises:

when the network selection condition of the target network is no longer met, determining, by the terminal based on the second priority order, a third network that meets the network selection condition, wherein the third network comprises a public network or a non-public network.

6. The network selection method according to claim 1, wherein the target network is a non-public network, and the method further comprises:

determining, by the terminal based on the first priority order, a fourth network to be accessed that meets the network selection condition, wherein the fourth network is a public network; or the target network is a public network, and the method further comprises:

determining, by the terminal based on the first priority order, a fourth network to be accessed that meets the network selection condition, wherein the fourth network is a non-public network.

7. The network selection method according to claim 2, wherein the target network is a non-public network, and the method further comprises:

determining, by the terminal based on the second priority order, a fourth network to be accessed that meets the network selection condition, wherein the fourth network is a public network; or the target network is a public network, and the method further comprises:

determining, by the terminal based on the second priority order, a fourth network to be accessed that meets the network selection condition, wherein the fourth network is a non-public network.

8. The network selection method according to claim 1, wherein the network selection policy information is carried by at least one of the following:

the network list controlled by the user;

the network list controlled by the credential holder;

the group identifier GIN list controlled by the credential holder;

the UE route selection policy (URSP);

a registration accept message;

a session establishment accept message; or a non-access stratum (NAS) message.

9. The network selection method according to claim 1, wherein after the obtaining, by a terminal, network selection policy information, the method further comprises:

activating a conditional non-public network access mode; or, wherein before the determining a target network to be accessed, the method further comprises:

activating a non-public network access mode, and determining that the target network to be accessed is a non-public network; or deactivating a non-public network access mode, and determining that the target network to be accessed is a public network.

10. The network selection method according to claim 1, wherein the method further comprises:

when the network selection condition of the target network is no longer met, deactivating a non-public network access mode, wherein the target network is a non-public network; or when the network selection condition of the target network is no longer met, activating a non-public network access mode, wherein the target network is a public network.

11. The network selection method according to claim 1, wherein the network selection condition comprises the location information, location information in a network selection condition of a fifth network comprises a target area, and before the determining that a first network meeting the network selection condition is the target network, the method further comprises:

when the terminal is located in the target area, determining, by the terminal, that the fifth network is the first network meeting the network selection condition.

12. The network selection method according to claim 1, wherein the target network comprises at least one of the following: a standalone non-public network (SNPN), a public network integrated non-public network (PNI-NPN), or a public network; or, wherein the network selection policy information is preconfigured in the terminal or comes from a network device in a home network of the terminal or a device of a service provider to which the terminal belongs.

13. The network selection method according to claim 2, wherein the obtaining, by a terminal, network selection policy information comprises:

obtaining, by the terminal, URSPs from a plurality of service providers; and obtaining, by the terminal, the network selection policy information based on priority information of the plurality of URSPs;

wherein the priority information of the plurality of URSPs comprises: a priority of a URSP of a service provider corresponding to a home network of the terminal is higher than priorities of URSPs of other service providers.

14. A non-transitory readable storage medium, wherein the non-transitory readable storage medium stores a program or instructions, and when the program or instructions are executed by a processor, the steps of the network selection method according to claim 1 are implemented.

15. A network selection method, comprising:

sending, by a network-side device, network selection policy information to a terminal, wherein the network selection policy information comprises a network identifier of at least one network and a network selection condition corresponding to the at least one network, the at least one network comprises at least one non-public network, the network selection condition corresponding to the at least one network is used by the terminal to determine a target network to be accessed, and the network selection condition comprises at least one of the following: time information, or location information, wherein the time information indicates that the network is selectable by the terminal at a time described by the time information, and the location information indicates that the network is selectable by the terminal when the terminal is at a location described by the location information.

16. The network selection method according to claim 15, wherein the network selection policy information is carried by at least one of the following:

a network list controlled by a user;

a network list controlled by a credential holder;

a group identifier GIN list controlled by the credential holder;

a UE route selection policy (URSP);

a registration accept message;

a session establishment accept message; or a non-access stratum (NAS) message.

17. The network selection method according to claim 15, wherein the target network comprises at least one of the following: a standalone non-public network (SNPN), a public network integrated non-public network (PNI-NPN), or a public network.

18. A network-side device, comprising a processor, a memory, and a program or instructions stored in the memory and capable of running on the processor, wherein when the program or instructions are executed by the processor, the steps of the network selection method according to claim 15 are implemented.

19. A terminal, comprising a processor, a memory, and a program or instructions stored in the memory and capable of running on the processor, wherein the program or instructions, when executed by the processor, causes the terminal to perform:

obtaining network selection policy information, wherein the network selection policy information comprises a network identifier of at least one network and a network selection condition corresponding to the at least one network, and the at least one network comprises at least one non-public network; and determining, based on the network selection condition corresponding to the at least one network, a target network to be accessed, wherein the network selection condition comprises at least one of the following: time information, or location information, wherein the determining, based on the network selection condition corresponding to the at least one network, a target network to be accessed comprises:

determining, based on a first priority order, that a first network meeting the network selection condition is the target network, wherein the first priority order represents an order of priorities of networks, and the priorities of the networks comprise priorities of at least two of the following: a network with which the terminal is previously registered, a network to which the terminal has subscribed, a network in a network list controlled by a user, a network in a network list controlled by a credential holder, a network in a group comprised in a group identifier GIN list controlled by the credential holder, and a second network, wherein the second network is a network allowed to be accessed other than an accessible network configured for the terminal.

* * * * *